(No Model.)
J. S. LAKE.
GROUND MARKER.
No. 284,439. Patented Sept. 4, 1883.
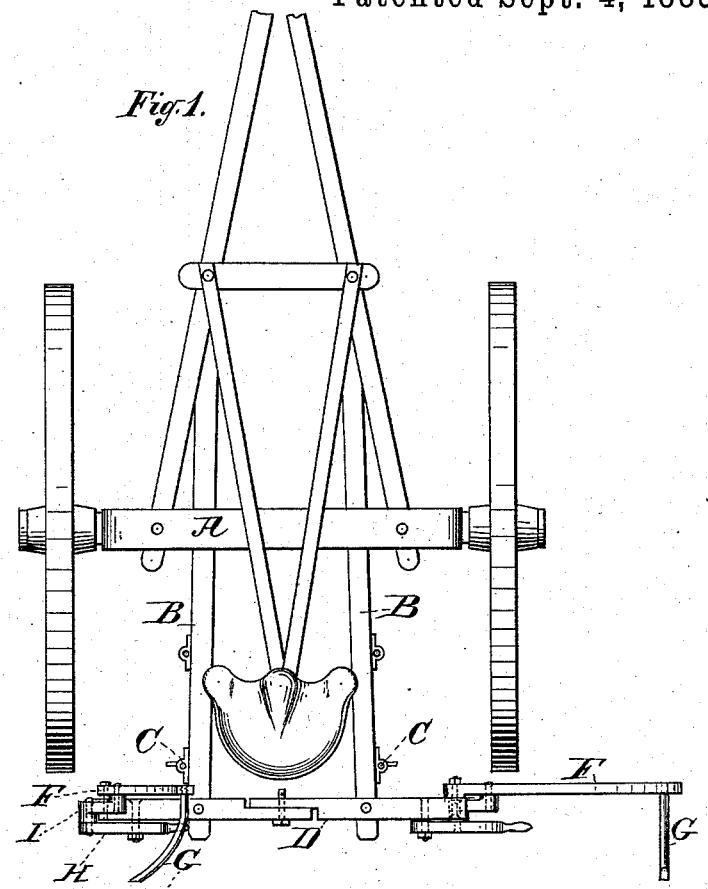
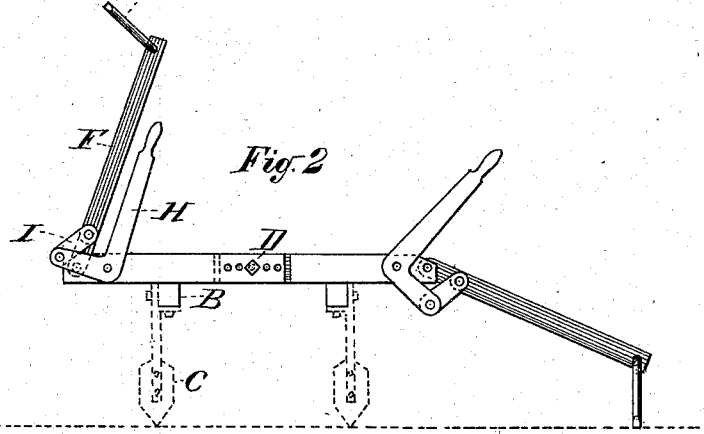
Witnesses:
Henry Gibling.
R. F. Gaylord,
Inventor
Jacob S. Lake,
by Saml. A. Duncan,
atty

UNITED STATES PATENT OFFICE.

JACOB S. LAKE, OF LEBANON, NEW JERSEY.

GROUND-MARKER.

SPECIFICATION forming part of Letters Patent No. 284,439, dated September 4, 1883.

Application filed March 12, 1883. (No model.)

*To all whom it may concern:*

Be it known that I, JACOB S. LAKE, of Lebanon, in the county of Hunterdon and State of New Jersey, have invented certain new and useful Improvements in Ground-Markers; and I hereby declare the following to be a full, clear, and accurate description thereof, which will enable those skilled in the art to make and use the same.

My invention relates to an auxiliary or removable marking device intended to be used on an ordinary cultivator; and it consists of a cross-bar arranged to be attached to the frame or drag-bars of a cultivator or similar machine, and having at each end swinging marking-arms and an improved arrangement of levers for lifting such arms.

In the accompanying drawings, Figure 1 is a plan view of a cultivator having my marker attached thereto, and Fig. 2 is a side view of the marker from a position in the rear of the cultivator.

In these views, A represents an ordinary sulky-cultivator for cultivating corn, B B being the drag-bars, which carry the plows or shovels C. When the cultivator is used for the purpose of marking ground, all the plows or shovels are removed, with the exception of the two rear ones, which are used to make the furrow in which the seed is dropped, the drag-bars are adjusted so that the plows are the same distance apart as the rows of corn are designed to be, and the auxiliary marking device is then secured to the cross-bars and keeps them in proper relative position.

The auxiliary marker is composed of a cross-bar, D, which is bolted to each of the drag-bars B. It is preferably constructed in two parts, as shown, these parts being adjustable one upon the other, in order to alter the length of the bar. At each end of the bar are pivoted swinging arms F F, which are provided with downwardly-projecting markers G G. These arms are operated by means of hand-levers H H, which are pivoted to the bar D at points between the pivotal bearings of the swinging arms F F, and are connected with these arms through the medium of links I I, jointed at one end to the short arms of the levers, and at the other ends to the swinging arms at points outside their pivots. By this arrangement the angular motion of the lifting-levers is much less than the corresponding motion of the swinging arms, so that only a slight depression of the former is necessary to raise the latter to the position they occupy when not in use, as seen on the left of the figures of drawings. The lines traced by the markers G G are at a distance from the outside shovel or plow equal to one and one-half times the distance between the plows, and the cultivator is driven with its longitudinal center directly over these tracings, which thus occur where the driver can easily follow them, and yet attend to his team.

When the cultivator is in operation, only one of the markers is down, and that of course is the outer one, or the one next the unmarked portion of the ground. When the end of a row is reached, the marker then in use is raised, the cultivator is turned to recross the ground, and the marker before idle is brought into use.

Although I have shown but one form of cultivator with which my marker can be used, it is evident that it can be applied to other forms of cultivators, and also to sulky and walking plows, and while I have described it as a guide for indicating the course of the planting shovels or plows, it might be arranged to carry plows or drills, and, instead of tracing a guiding-line, make the channel which receives the seed.

I am aware that levers have been used heretofore to raise swinging marker-arms attached to a cross-piece; and I do not claim such, broadly; but What I do claim is—

The combination, with the cultivator A or similar machine, of the marking device, consisting of the detachable cross-bar D, swinging marker-arms F F, hand-levers H H, pivoted on said bar between said arms, and links I I, pivoted to the shorter arms of said levers and to said arms, as shown, whereby the said arms have a greater angular motion than said levers, as and for the purpose set forth.

JACOB S. LAKE.

Witnesses:
 W. F. HAPGOOD,
 R. F. GAYLORD.